United States Patent [19]

Graf et al.

[11] Patent Number: 4,650,132
[45] Date of Patent: Mar. 17, 1987

[54] METHOD OF USING A CONTROLLED MAGNETIC BEARING ARRANGEMENT IN A TEXTILE WINDING DEVICE AND TEXTILE WINDING DEVICE FOR USE WITH SPINNING MACHINES AND EQUIPPED WITH SUCH CONTROLLED MAGNETIC BEARING ARRANGEMENT

[75] Inventors: Felix Graf, Winterthur; Armin Wirz, Ossingen; Heinz Mutter, Winterthur, all of Switzerland

[73] Assignee: Rieter Machine Works Limited, Winterthur, Switzerland

[21] Appl. No.: 832,222

[22] Filed: Feb. 24, 1986

[30] Foreign Application Priority Data

Mar. 1, 1985 [CH] Switzerland ............................ 932/85

[51] Int. Cl.$^4$ ........................................... B65H 54/42
[52] U.S. Cl. ............................ 242/18 DD; 242/18 R; 310/90.5
[58] Field of Search .............. 242/18 DD, 18 R, 46.2; 310/90, 90.5

[56] References Cited

U.S. PATENT DOCUMENTS

| | | | |
|---|---|---|---|
| 3,650,581 | 3/1972 | Boden et al. | 310/90.5 |
| 3,698,775 | 10/1972 | Gilbert | 310/90.5 |
| 3,731,984 | 5/1973 | Habermann | 310/90.5 |
| 3,845,997 | 11/1974 | Boden et al. | 310/90.5 |
| 3,970,260 | 7/1976 | Bruggisser et al. | 242/18 DD |
| 4,037,886 | 7/1977 | Boden et al. | 310/90.5 |
| 4,080,012 | 3/1978 | Boden et al. | 310/90.5 |
| 4,387,936 | 6/1983 | Ishizawa | 310/90.5 |
| 4,394,985 | 7/1983 | Graf et al. | 242/18 DD |

Primary Examiner—Stanley N. Gilreath
Attorney, Agent, or Firm—Werner W. Kleeman

[57] ABSTRACT

The controlled magnetic bearing arrangement supports a rotatable shaft and contains an electronic control circuit. The shaft is floatingly supported in the bearing arrangement by magnets controlled by the electronic control circuit and the stiffness of the shaft is thereby adjustable. The shaft may constitute a package support shaft in a winding device of a spinning machine and has a free end for permitting the axial exchange of bobbin tubes and packages. This arrangement provides the advantages of attaining very high rotational speeds for the package support shaft and the possibility of varying the stiffness of such package support shaft and thus the critical rotational speeds. The regions of the critical rotational speeds can be passed through in a safe manner.

22 Claims, 2 Drawing Figures

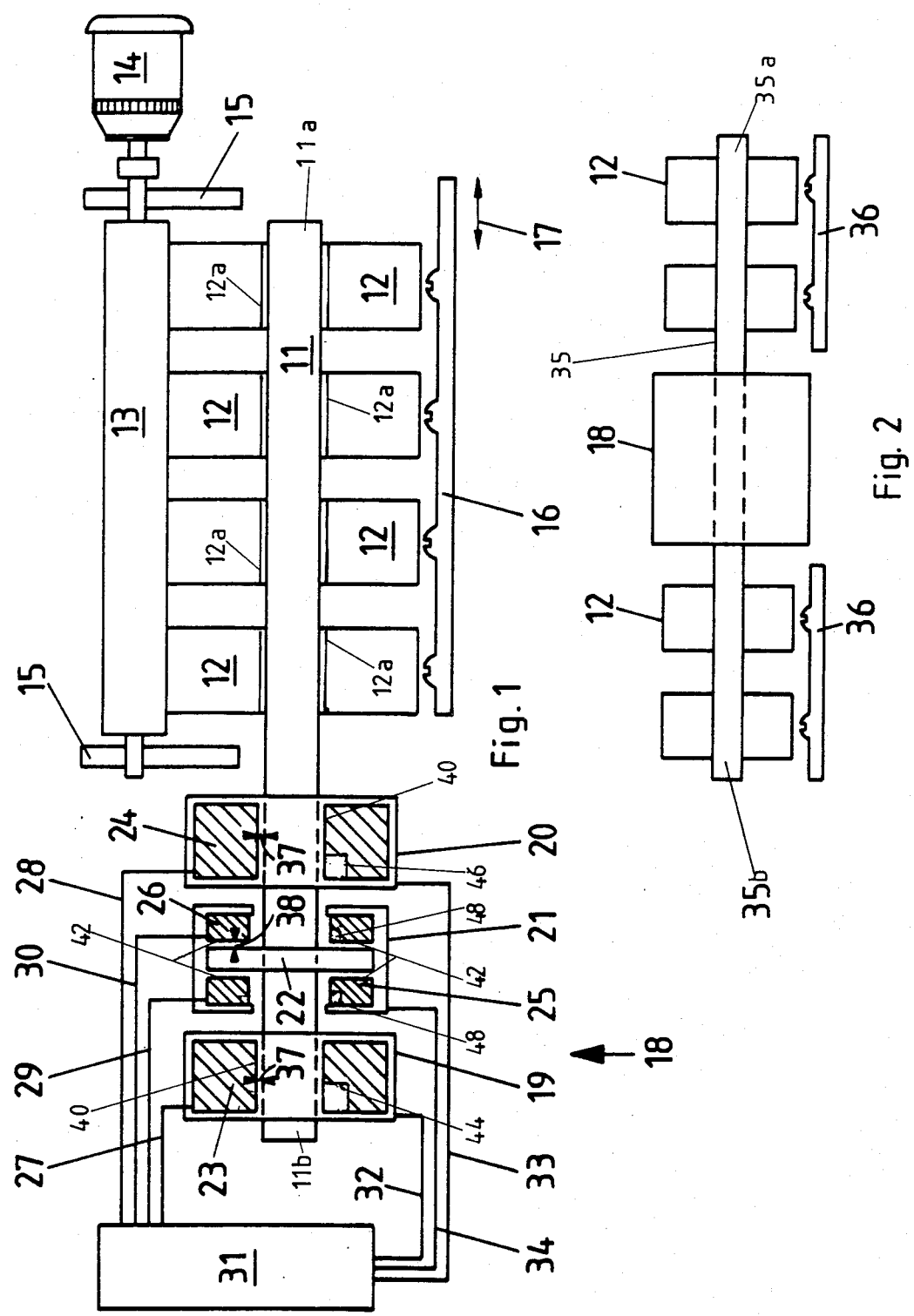

METHOD OF USING A CONTROLLED MAGNETIC BEARING ARRANGEMENT IN A TEXTILE WINDING DEVICE AND TEXTILE WINDING DEVICE FOR USE WITH SPINNING MACHINES AND EQUIPPED WITH SUCH CONTROLLED MAGNETIC BEARING ARRANGEMENT

BACKGROUND OF THE INVENTION

The present invention relates to a new and improved method of using a controlled or controllable magnetic bearing arrangement in a textile winding device. The present invention also relates to a new and improved construction of a winding device for use with a spinning machine and equipped with such controlled or controllable magnetic bearing arrangement.

In its more particular aspects the present invention specifically relates to a new and improved method of using a controlled magnetic bearing arrangement which is intended for use with a rotatable shaft in a textile winding device. The controlled magnetic bearing arrangement contains a predetermined number of stationary electromagnets arranged in a substantially circular annular relationship. An electronic control means or circuit is provided for appropriately controlling the electric currents flowing through the stationary electromagnets.

A controlled magnetic bearing arrangement as described, for example, in a brochure published by Societe de Mechanique Magnetique, BP 431,27204 Vernon Cedex, France and commercialized under the trademark "ACTIDYNE", can be utilized for supporting shafts which rotate at variable rotational speeds. The shaft is floatingly supported and can pass through critical rotational speeds without the excitation or generation of dangerous resonance vibrations.

Known winding devices for use during spinning operations contain a plurality of packages which are located on a common support shaft and which are simultaneously wound. When the packages reach their fully-wound condition, the weight of each individual package may amount to more than 20 kg. It is desirable during the winding operation to select the winding speed in such a manner that the related threads are wound up on each package at a rate of up to 6,000 meters per minute.

These requirements cannot be satisfied by the currently available means or expedients or can be satisfied only inadequately. The encountered difficulties include bending of the package supporting or support shaft in dependence upon the weight of the packages, and more particularly the presence of critical rotational speeds, that is to say, rotational speeds associated with different orders of the resonance vibrations of the package support shaft. These critical rotational speeds are caused by the occurrence of resonance at the natural vibrational frequencies of the package support shaft. The package support shaft can be destroyed at such critical rotational speeds and this can be extremely dangerous considering the high rotational speeds and the weights of the processed packages.

Attempts have been made to adapt the currently used winding devices to the spinning machines by immediately winding up the thread or the like which is delivered by the spinning machine, and adapting the rotational speed of the package to the thread delivery speed, see, for example, U.S. Pat. No. 4,394,985, granted July 26, 1983. This requires a continuous adaptation to the continually increasing weights of the packages and to the continually decreasing rotational speed during the winding operations. During such adaptation, operation at or near the critical rotational speeds can arise of necessity. Due to the previously mentioned considerable danger, operation in the region of the critical rotational speeds during such adaptation cannot be tolerated. Thus, optimal rotational speeds cannot be maintained under certain conditions which necessarily arise during the previously mentioned continuous variations, and thus the spinning machine or installation cannot be operated or used at full capacity.

SUMMARY OF THE INVENTION

Therefore, with the foregoing in mind, it is a primary object of the present invention to provide a new and improved method of using a controlled magnetic bearing arrangement in a manner which is not afflicted with the drawbacks and limitations of the prior art discussed hereinbefore.

It is a further significant object of the present invention to provide a new and improved construction of a winding device for use with a spinning machine and which winding device is not afflicted with the drawbacks and limitations of the prior art constructions discussed hereinbefore.

Another important object of the present invention is directed to a new and improved construction of a winding device for use with a spinning machine and which winding device can be operated at variable rotational speeds and at full capacity of the spinning machine without being endangered by resonance vibrations.

In order to implement these and still further objects of the invention, which will become more readily apparent as the description proceeds, the method of the present development is manifested by the features that, the controlled magnetic bearing arrangement is used for rotatably supporting the package support shaft of a winding device operatively associated with a spinning machine or installation.

The package support shaft serves, by means of bobbin tubes placed thereat, for winding-up threads or the like, particularly endless synthetic filaments, in order to form packages. The support package shaft is provided with at least one free end. The bobbin tubes are axially slid or inserted upon the at least one free end and the completed packages are axially removed from the at least one free end of the package support shaft.

As already alluded to above, the invention is not only concerned with the aforementioned method aspects but also relates to an improved construction of a winding device for use with a spinning machine.

In its more particular aspects, the inventive package winding device comprises:

a rotatable package support shaft supporting a predetermined number of bobbin tubes which are exchangeably mounted in an end-on manner at the rotatable package support shaft i.e. these bobbin tubes are inserted onto the shaft from at least one free end thereof and supported thereupon;

drive means for rotatably driving the package support shaft in order to thereby wind-up threads delivered by the spinning machine on related ones of the predetermined number of bobbin tubes in order to thereby form related packages from the threads;

a controlled magnetic bearing arrangement containing a predetermined number of stationary electromagnets for rotatably supporting the package support shaft;

control means controlling the electric current flowing through said predetermined number of electromagnets; and the control means controlling the electric current flowing through the predetermined number of electromagnets such that the package support shaft is floatingly arranged in the controlled magnetic bearing arrangement and the electric current is regulated as a function of the position of the package support shaft in the magnetic bearing arrangement.

It is a main advantage which is achieved by the invention that the stiffness as well as the damping of vibrations of the package support shaft can be adjusted by regulating the degree of magnetization such that it is not necessary to perform the winding operation at or immediately close to a critical rotational speed. Passage through the regions of critical rotational speeds is carried out during the regulating operation. In other words, in the event of an approach to a critical rotational speed, the passage through the region of the critical rotational speed can be accomplished within a very short time duration by varying the stiffness of the package support shaft simultaneously with the variation in the rotational speed of the package support shaft, so that in practice there does not arise any build-up of vibrations caused by resonance. This enables complete adaptation to the spinning machine or installation, to the different occurring winding conditions of the packages and to the various types of threads as concerns the thread material and thread density, that is to the different package weights.

This is a decisive advantage for the spinning mill operation, particularly since varying package weights cause different degrees of bending in the package support shaft and thus varying critical rotational speeds. Therefore, the use of the controlled magnetic bearing arrangement offers very specific advantages for different winding operations and winding devices used in combination with spinning machines or installations.

In this connection, it is mentioned as a matter of completeness that the material density in cross-wound packages can have values in the range of 0.35 to 0.55 g/cm$^3$ for texturized yarns and 0.7 to 0.95 g/cm$^3$ for smooth yarns. These values are, for example, dependent upon the thread tension, the angle of lay in the package or the yarn count. In general, values lying between approximately 0.3 and 1.0 g/cm$^3$ and thus considerable variations must be anticipated.

In accordance with the invention, there is obtained the additional advantage that the package support shaft rotates in a frictionless manner and thus no bearing lubrication is required. This is especially important in connection with textile materials because soiling thereof cannot be tolerated.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 is a partially sectional schematic top plan view of an exemplary embodiment of a winding device constructed in accordance with the present invention; and FIG. 2 is a schematic illustration of a further embodiment of the inventive winding device.

DETAILED DESCRIPTION OF THE PREFERRED EMBODIMENTS

Describing now the drawings, it is to be understood that to simplify the showing thereof, only enough of the structure of the inventive winding device has been illustrated therein as is needed to enable one skilled in the art to readily understand the underlying principles and concepts of the present invention. Turning now specifically to FIG. 1 of the drawings, there is shown a package support shaft or chuck 11 which supports four packages 12. The packages 12 are formed by winding not specifically illustrated threads or the like onto bobbin tubes 12a which are mounted on the package support shaft 11. A drive roll 13 is pressed against the packages 12 and serves to set into rotation these packages 12 along with the package support shaft 11. Drive means 14 constituting an electric motor are provided to rotatably drive the package support shaft 11 via the drive roll 13 and the packages 12. Since the diameter of the packages 12 continuously increases during winding-up of the threads, the drive roll 13 and the electric motor 14 are appropriately movable as a unit along support rails 15 as is known in this technology. A thread traversing guide 16 or equivalent structure is provided for guiding the threads to be wound and is movable in the directions indicated by the double-headed arrow 17.

In the illustrated embodiment shown in FIG. 1 of the drawings the rotatably driven package support shaft 11 contains a free shaft end 11a which supports a predetermined number, in the illustrated embodiment, namely for instance four packages 12 which are exchangeably mounted at the free end 11a in an end-on manner i.e. the bobbin tubes 12a upon which the thread packages 12 are formed are doffed or inserted onto the package support shaft 11 from such free end 11a . As just explained, the bobbin tubes 12a are axially placed on the free end 11a of the package support shaft 11 and, at the end of the winding operation and after completion of the wound packages 12, these wound packages 12 are axially again removed from the free end 11a.

The inventive winding device is specifically suited for winding up packages 12 from endless synthetic filaments delivered by a not specifically illustrated spinning machine with which the inventive winding device is operatively associated.

A controlled magnetic bearing arrangement containing a predetermined number of stationary electromagnets 23, 24, 25 and 26 is generally designated by the reference numeral 18 and constitutes a bearing which rotatably supports the rotatable package support shaft 11. In the specific illustrated embodiment, the controlled magnetic bearing arrangement 18 comprises two radial magnetic bearings 19 and 20 and one axial magnetic bearing 21; however, the controlled magnetic bearing arrangement 18 may contain any other number of radial and axial magnetic bearings as required for the purposes of the momentary winding operations. At least in the region of the radial magnetic bearings 19 and 20, the package support shaft 11 contains a predetermined region 11b which is made of a suitable magnetic or magnetizable material for a purpose to be described further hereinbelow.

The radial magnetic bearings 19 and 20 contain a preselected number of the aforementioned stationary electromagnets, namely the electromagnets 23 and 24, each of which is formed by a plurality of individual, laterally abutting electromagnets arranged in a substantially circular annular relationship or configuration around the package support shaft 11. The end faces of the pole shoes or pole pieces, generally indicated by reference numeral 40, of the individual electromagnets are directed towards the package support shaft 11 and lie on a substantially cylindrical surface which is separated by a small spacing or intermediate gap 37 from the rotatable package support shaft 11. During operation, the package support shaft 11 is floatingly arranged or supported by the magnetic fields of the stationary electromagnets 23 and 24 which form the two radial magnetic bearings 19 and 20 of the controlled or controllable magnetic bearing arrangement 18.

In order to prevent displacement of the package support shaft 11 in its axial direction, there are provided the axial magnetic bearing 21 and a disk 22 which is made of a suitable magnetic or magnetizable material and which is mounted at and extends essentially perpendicular to the package support shaft 11. A further preselected number of the aforementioned stationary electromagnets, namely in this case the electromagnets 25 and 26, are arranged on both sides of the disk 22 and annularly surround the package support shaft 11. The pole shoes or pole pieces 42 of the electromagnets 25 and 26 are directed towards the disk 22. During operation the electromagnets 25 and 26 are energized or magnetized such that a narrow intervening gap 38 is formed between these electromagnets 25 and 26 and the disk 22 on both sides of the disk 22.

The electromagnets 23, 24, 25 and 26 of the magnetic bearings 19, 20 and 21 are energized or magnetized via related electrical cables or lines 27, 28, 29 and 30. The magnetization of the electromagnets 23 to 26 is variable and is appropriately regulated by any suitable control means or circuit 31.

In the case of the stationary electromagnets 23 and 24 of the respective radial magnetic bearings 19 and 20, this regulation is carried out by regulating the electric current flowing through the stationary electromagnets 23 and 24 in dependence upon the centering of the package support shaft 11 with respect to the individual magnets arranged in the aforementioned circular annular manner or configuration around the package support shaft 11. In the case of the stationary electromagnets 25 and 26 of the axial magnetic bearing 20 this regulation is carried out by regulating the electric current flowing through the stationary electromagnets 25 and 26 such that the spacings of the disk 22 from the stationary electromagnets 25 and 26 are of equal magnitude.

The accuracy of the centering of the package support shaft 11 and of the central positioning of the disk 22 is continually monitored by means of suitable sensors 44, 46, and 48 generating signals which indicate deviations from the desired positions of the package support shaft 11 and the disk 22 and which are fed via the electrical cables or lines 32, 33 and 34 to the control means or circuit 31.

During operation of the illustrated embodiment of the inventive winding device, the electric motor 14 sets into rotation the drive roll 13. The packages 12 engaging the drive roll 13 are thereby entrained and set into rotation conjointly with the package support shaft 11. During this operation related threads are wound up on the packages 12.

The thread traversing guide 16 guides the aforementioned threads in known manner such as to produce the desired type of thread winding. During the winding operation, the diameter of the packages 12 increases continually. Therefore, the unit encompassing the drive roll 13 and the electric motor 14 is displaceably mounted at horizontal support rails 15 and the drive roll 13 continually engages the packages 12. Since the length of thread delivered by the spinning machine per unit time is constant, the rotational speed of the packages 12 and thus the rotational speed of the package support shaft 11 continually decreases with increasing package diameter and at constant rotational speed of the drive roll 13.

The package support shaft 11 is continuously held in a centered and floating position by means of the electromagnets 23 and 24. Every deviation from this centered position which is continuously monitored by the aforementioned sensors 44 and 46, is indicated at the control means or circuit 31 by means of the electrical sensor output signals transmitted via the electrical leads 32 and 33. The control means or circuit 31 processes these signals and thereby generates control signals for individually regulating the electric current fed to the individual magnets of the stationary electromagnets 23 and 24 forming the radial magnetic bearings 19 and 20, such that deviations of the package support shaft 11 from a set or reference position are instantaneously and continually corrected.

In analogous manner, the package support shaft 11 is maintained in its predetermined position in axial direction. The sensors 48 monitor the intervening gaps or spaces 38 between the disk 22 and the stationary electromagnets 25 and 26 which form the axial magnetic bearing 21. Deviations from predetermined set or reference values of these intervening gaps or spaces 38 are indicated to the control means or circuit 31 by electrical sensor output signals transmitted via the electrical lead 34. In the control means or circuit 31, these sensor output signals serve for regulating the magnetizing current fed to the stationary electromagnets 25 and 26 via the related cables 29 and 30. Deviations in the position of the disk 22 from the set or reference value are thus instantaneously and continually corrected.

The package support shaft 11 rotates in a freely floating manner in the controlled magnetic bearing arrangement 18 without coming into contact with any one of the members of this bearing arrangement. Thus, there is no mechanical friction and no mechanical wear. Since no lubrication is required, there is no soiling of the thread material due to lubrication.

The package support shaft 11 possesses the aforementioned predetermined region 11b which is made of magnetizable material. By varying the degree of magnetization of this region 11b of the package support shaft 11, the stiffness of the package support shaft 11 can be varied in order to change or shift the critical rotational speeds associated with the different orders of resonance vibrations of the package support shaft 11. This is of decisive significance because there thus results the possibility of realizing the following mode of operation:

During the previously mentioned continual reduction of the rotational speed of the package support shaft 11 during the course of a winding operation, the necessity may arise for a passage of the package support shaft 11 through one of its critical rotational speeds. It will be assumed that, under the given operating conditions, this critical rotational speed lies at $n_1$ revolutions per minute. In order to pass through the rotational speed having this value $n_1$ and in accordance with the teachings of the invention, the stiffness of the package support shaft 11 is varied by varying the degree of magnetization in the predetermined region 11b of the package support shaft 11. There is thereby changed the critical rotational speed of the package support shaft 11, for example, to a value corresponding to $n_2$ revolutions per minute. In this manner, it is possible to operate, if desired, at the rotational speed corresponding to $n_2$ revolutions per minute which is not critical in view of the altered degree of magnetization. If, however, it is desired to pass through the critical rotational speed corresponding to $n_1$ revolutions per minute, then the degree of magnetization in the predetermined region 11b of the package support shaft 11 is returned to its original value after the value corresponding to $n_1$ revolutions per minute has been passed and before the value corresponding to $n_2$ revolutions per minute is reached. This takes place in an extremely short period of time. Thus, the passage through the critical rotational speed which is now located between the values $n_1$ and $n_2$, during this return operation is of extremely short duration.

Thus there is no time for the formation of resonance vibrations and the passage through the critical rotational speed between the values $n_1$ and $n_2$ occurs in a completely safe manner during the return magnetization of the predetermined region 11b of the package support shaft 11.

In accordance with FIG. 1, two radial magnetic bearings 19 and 20 and one axial magnetic bearing 21 are provided. The mutual spacing of the two radial magnetic bearings 19 and 20 is matched to correspond to the portion of the package support shaft 11 at which portion the packages 12 are placed, and to the thickness of the package support shaft 11 and other suitably selected parameters, if desired, taking into account the package weight. Likewise, the number of radial magnetic bearings is selected in dependence upon the momentary circumstances, but in general there will be selected two such radial magnetic bearings.

It can be advantageous to provide conditions which are balanced in terms of weight with respect to the controlled magnetic bearing arrangement 18. For this purpose and as illustrated for a further embodiment of the inventive winding device in FIG. 2, the same number of packages 12 can be mounted on both sides of the controlled magnetic bearing arrangement 18 at related free ends 35a and 35b of a package support shaft 35. In such arrangement, a single radial magnetic bearing is sufficient. In such a case, the provision of two thread traversing guides 36 was found useful.

In a further development of the inventive winding device, the drive of the package support shaft 11 and the packages 12 is not effected, as shown in FIG. 1, by means of the separately installed conventional electric motor 14, but by means of an electric motor which is incorporated into the controlled magnetic bearing arrangement 18.

While there are shown and described present preferred embodiments of the invention, it is to be distinctly understood that the invention is not limited thereto, but may be otherwise variously embodied and practiced within the scope of the following claims.

Accordingly, what we claim is:

1. A method of using a controlled magnetic bearing arrangement formed by a predetermined number of stationary electromagnets arranged in a substantially circular annular relationship and further containing control means controlling the electric current flowing through said predetermined number of electromagnets, said method comprising the steps of:
   providing such a controlled magnetic bearing arrangement; and
   rotatably supporting a package support shaft in a package winding device operatively associated with a spinning machine by means of said controlled magnetic bearing arrangement.

2. The method as defined in claim 1, further including the steps of:
   arranging a preselected number of said predetermined number of stationary electromagnets around said package support shaft and thereby forming at least one radial magnetic bearing of said controlled magnetic bearing arrangement;
   using said control means for controlling the electric current flowing through said preselected number of electromagnets such that said package support shaft is floatingly supported by said at least one radial magnetic bearing; and
   during said step of controlling said electric current flowing through said preselected number of electromagnets, regulating said electric current as a function of a substantially radial position of said package support shaft in said at least one radial magnetic bearing.

3. The method as defined in claim 2, further including the steps of:
   providing said package support shaft with a predetermined region made of a magnetizable material;
   arranging said predetermined region of said package support shaft in said at least one radial magnetic bearing; and
   controlling said electric current flowing through said preselected number of electromagnets such that said magnetizable material in said predetermined region of said package support shaft is magnetized to a predetermined degree of magnetization.

4. The method as defined in claim 3, further including the steps of:
   placing a predetermined number of bobbin tubes on at least one free end of said package support shaft;
   during said step of rotatably supporting said package support shaft, rotatably driving said package support shaft in order to thereby wind-up packages of related threads delivered by said spinning machine; and
   removing said wound packages from said at least one free end of said package support shaft.

5. The method as defined in claim 4, wherein:
   said step of winding-up packages includes the step of winding-up packages from endless synthetic filaments delivered by said spinning machine.

6. The method as defined in claim 4, wherein:
   said step of placing said predetermined number of bobbin tubes on said package support shaft entails the step of substantially axially sliding said predetermined number of bobbin tubes onto said at least one free end of said package support shaft; and
   said step of removing said wound packages from said package support shaft, entails the step of substantially axially removing said wound packages from said at least one free end of said package support shaft.

7. The method as defined in claim 1, further including the steps of:
providing at least one disk made of magnetizable material which is arranged substantially perpendicularly at said package support shaft;
annularly arranging a further preselected number of said predetermined number of stationary electromagnets on both sides of said at least one disk and thereby forming at least one axial magnetic bearing of said controlled magnetic bearing arrangement;
during said step of annularly arranging said further preselected number of stationary electromagnets on both sides of said at least one disk, directing pole pieces of said further preselected number of said stationary electromagnets towards said at least one disk;
connecting said further preselected number of said stationary electromagnets to said control means; and
controlling the flow of electric current through said further preselected number of stationary electromagnets and thereby regulating said flow of electric current as a function of the position of said at least one disk relative to said axial magnetic bearing for the purpose of substantially axially supporting said package support shaft.

8. The method as defined in claim 1, further including the step of:
arranging at least two radial magnetic bearings and at least one axial magnetic bearing in said controlled magnetic bearing arrangement for rotatably supporting said package support shaft.

9. The method as defined in claim 4, wherein:
said step of rotatably driving said package support shaft entails the step of using an electric motor for rotatably driving said package support shaft; and
incorporating said electric motor in said controlled magnetic bearing arrangement.

10. The method as defined in claim 4, further including the steps of:
arranging said magnetizable material of said predetermined region of said package support shaft between the ends of said package support shaft and thereby forming two free ends of said package support shaft;
said step of placing said bobbin tubes on said at least one free end of said package support shaft, entails the step of placing a preselected number of bobbin tubes on each one of said two free ends of said package support shaft; and
said step of removing said wound packages from said at least one free end of said package support shaft, entails the step of removing said preselected number of wound packages from each one of said two free ends of said package support shaft.

11. The method as defined in claim 10, wherein:
said step of placing said preselected number of bobbin tubes on each one of said two free ends of said package support shaft, includes the step of placing substantially equal preselected numbers of bobbin tubes on said two free ends of said package support shaft.

12. A winding device for use with a spinning machine and comprising:
a rotatable package support shaft;
said rotatable package support shaft supporting a predetermined number of bobbin tubes exchangeably mounted in an end-on manner at said rotatable package support shaft;
drive means for rotatably driving said package support shaft in order to thereby wind-up threads delivered by said spinning machine on related ones of said predetermined number of bobbin tubes in order to thereby form related packages from said threads;
a controlled magnetic bearing arrangement containing a predetermined number of stationary electromagnets for rotatably supporting said package support shaft;
control means controlling the electric current flowing through said predetermined number of stationary electromagnets; and
said control means controlling said electric current flowing through said predetermined number of stationary electromagnets such that said package support shaft is floatingly arranged in said controlled magnetic bearing arrangement and said electric current is regulated as a function of the position of said package support shaft in said magnetic bearing arrangement.

13. The winding device as defined in claim 12, wherein:
said package support shaft contains at least one free end; and
said predetermined number of bobbin tubes being substantially axially slidably mountable at and substantially axially slidably removable from said at least one free end of said package support shaft.

14. The winding device as defined in claim 12, wherein:
said threads delivered by said spinning machine and wound-up upon said bobbin tubes constitute endless synthetic filaments.

15. The winding device as defined in claim 12, wherein:
said controlled magnetic bearing arrangement contains at least one radial magnetic bearing substantially radially supporting said package support shaft;
said at least one radial magnetic bearing containing a preselected number of said predetermined number of stationary electromagnets; and
said preselected number of stationary electromagnets being arranged in a substantially circular annular relationship around said predetermined region of said package support shaft.

16. The winding device as defined in claim 15, wherein:
said package support shaft containing a predetermined region which is made of a magnetizable material;
said predetermined region of said package support shaft being arranged in the region of said at least one radial magnetic bearing; and
said control means additionally regulating said electric current flowing through said preselected number of stationary electromagnets in order to thereby regulate the degree of magnetization of said magnetizable material in said predetermined region of said package support shaft.

17. The winding device as defined in claim 12, wherein:

said controlled magnetic bearing arrangement contains at least one axial magnetic bearing substantially axially supporting said package support shaft;
at least one disk made of a magnetizable material;
said disk being mounted at said package support shaft such as to extend substantially perpendicularly to said package support shaft;
said at least one axial magnetic bearing containing a further preselected number of said predetermined number of stationary electromagnets arranged on both sides of said disk and substantially annularly surrounding said package support shaft;
each one of said further preselected number of stationary electromagnets containing a pole piece directed towards said disk;
said further preselected number of stationary electromagnets being connected to said control means; and
said control means controlling the electric current flowing through said further preselected number of stationary electromagnets such that said electric current is regulated as a function of the position of said disk between said further preselected number of stationary electromagnets.

18. The winding device as defined in claim 17, wherein:
said at least one axial magnetic bearing constitutes only one axial magnetic bearing.

19. The winding device as defined in claim 15, wherein:
said at least one radial magnetic bearing constitutes only two such radial magnetic bearings.

20. The winding device as defined in claim 12, wherein:
said drive means for rotating said package support shaft contain an electric motor; and
said electric motor being incorporated into said controlled magnetic bearing arrangement.

21. The winding device as defined in claim 13, wherein:
said at least one free end of said package support shaft constitutes two such free ends;
said controlled magnetic bearing arrangement defining two sides;
each one of said two free ends of said package support shaft extending on a relative one of said two sides of said controlled magnetic bearing arrangement; and
each one of said two free ends of said package support shaft supporting a predetermined number of bobbin tubes.

22. The winding device as defined in claim 21, wherein:
said two free ends of said package support shaft support substantially the same predetermined number of bobbin tubes.

* * * * *